(12) United States Patent
Wynne et al.

(10) Patent No.: US 6,207,312 B1
(45) Date of Patent: Mar. 27, 2001

(54) SELF-HUMIDIFYING FUEL CELL

(75) Inventors: Robert Kenneth Wynne, Lake Park; Jay Kevin Neutzler; Frano Barbir, both of Palm Beach Gardens; Vladimir Gurau, Miami; Walter Edward Pierce, III, Lake Worth, all of FL (US)

(73) Assignee: Energy Partners, L.C., West Palm Beach, FL (US)

( * ) Notice: Subject to any disclaimer, the term of this patent is extended or adjusted under 35 U.S.C. 154(b) by 0 days.

(21) Appl. No.: 09/156,714

(22) Filed: Sep. 18, 1998

(51) Int. Cl.[7] ............................ H01M 8/00; H01M 2/00; H01M 8/10; H01M 2/14
(52) U.S. Cl. ............................... 429/34; 429/13; 429/38; 429/46; 429/39; 429/30; 429/40
(58) Field of Search ............................ 429/34, 38, 46, 429/39, 30, 40, 13

(56) References Cited

U.S. PATENT DOCUMENTS

| | | | |
|---|---|---|---|
| 4,169,917 | 10/1979 | Baker et al. | 429/26 |
| 4,407,904 | 10/1983 | Uozumi et al. | 429/26 |
| 4,522,894 | 6/1985 | Hwang et al. | 429/17 |
| 4,588,661 | 5/1986 | Kaufman et al. | 429/36 |
| 4,631,239 | 12/1986 | Spurrier et al. | 429/39 |
| 4,686,157 | 8/1987 | Miyake et al. | 429/19 |
| 4,849,308 | 7/1989 | Schmitten et al. | 429/37 |
| 4,988,583 | 1/1991 | Watkins et al. | 429/30 |
| 5,019,463 | 5/1991 | Matsubara et al. | 429/12 |
| 5,047,298 | 9/1991 | Perry, Jr. et al. | 429/17 |
| 5,100,744 | 3/1992 | Harashima | 429/22 |
| 5,108,849 | 4/1992 | Watkins et al. | 429/30 |
| 5,176,966 | 1/1993 | Epp et al. | 429/26 |
| 5,178,969 | 1/1993 | Amemiya | 429/26 |
| 5,187,024 | 2/1993 | Matsumura | 429/24 |
| 5,192,627 | 3/1993 | Perry, Jr. et al. | 429/17 |
| 5,200,278 | 4/1993 | Watkins et al. | 429/24 |
| 5,230,966 | 7/1993 | Voss et al. | 420/26 |
| 5,232,792 | 8/1993 | Reznikov | 429/14 |
| 5,284,718 | 2/1994 | Chow et al. | 429/26 |
| 5,300,370 | 4/1994 | Washington et al. | 429/34 |
| 5,342,706 | 8/1994 | Marianowski et al. | 429/35 |
| 5,360,679 | 11/1994 | Buswell et al. | 429/19 |
| 5,401,589 | 3/1995 | Palmer et al. | 429/13 |
| 5,464,700 | 11/1995 | Steck et al. | 429/30 |
| 5,486,430 | 1/1996 | Gorbell et al. | 429/35 |
| 5,514,487 | 5/1996 | Washington et al. | 429/39 |
| 5,521,018 | 5/1996 | Wilkinson et al. | 42/26 |

Primary Examiner—Stephen Kalafut
Assistant Examiner—Tracy Dove
(74) Attorney, Agent, or Firm—Akerman, Senterfitt (57) ABSTRACT

A self-humidifying polymer electrolyte membrane (PEM) fuel cell assembly has an ion-exchange membrane interposed between hydrogen and oxygen diffusion layers to form a membrane electrode assembly (MEA). The MEA is in turn interposed between a pair of current collector plates having flow field channels for flowing the reactants adjacent the respective diffusion layers to produce corresponding anodic and cathodic electrochemical reactions. Various embodiments of the assembly incorporate one or more of the following features: interdigitated flow field channels, countercurrent reactant flows, opposing channel alignment, and uncatalyzed membrane hydration enhancement zones.

32 Claims, 6 Drawing Sheets

SELF-HUMIDIFYING FUEL CELL

FIELD OF THE INVENTION

This invention relates generally to electrochemical fuel cells, and more particularly to a self-humidifying polymer electrolyte membrane (PEM) fuel cell which, in operation, employs at least one dry reactant gas.

BACKGROUND OF THE INVENTION

Electrochemical fuel cells convert fuel and oxidant to electricity and reaction product. Solid polymer electrochemical fuel cells generally employ a membrane electrode assembly (MEA) interposed between gas diffusion backings. The MEA and gas diffusion backing arrangement is, in turn, interposed between anode and cathode flow field/current collector plates. The MEA includes a solid polymer electrolyte membrane (PEM)—also referred to as an ion exchange membrane or proton exchange membrane—having electrodes on either side thereof. The electrodes may be attached directly to the PEM membrane. Alternatively, the electrodes may be attached to or integrated into the gas diffusion backings, and the backings pressed against the PEM membrane. Gas diffusion backings are typically fabricated of porous, electrically conductive sheet materials, such as carbon/graphite fiber paper or carbon/graphite cloth. These gas diffusion layers often incorporate micro diffusion layers. A catalyst layer, typically in the form of platinum or platinum supported on carbon particles, is located at each membrane/electrode interface to induce the desired electrochemical reactions. The electrodes are typically coupled to one another to provide an electrical path for conducting electrons between the electrodes to an external load. Hydrophobic enhancement materials, such as Teflon®, may be incorporated into the fuel cell to aid with product removal.

At the anode, a fuel-reducing reagent reacts at the catalyst layer to form cations. These are thermodynamically driven through the membrane toward the cathode. At the cathode, oxidant reagent reacts at the catalyst layer to form anions. The anions formed at the cathode react with the cations to form reaction product. In electrochemical fuel cells employing hydrogen (or hydrogen-containing gas) as the fuel, and oxygen (or oxygen-containing gas) as the oxidant, the reaction at the anode produces hydrogen cations, or protons, from the fuel supply. The proton exchange membrane facilitates the migration of hydrogen protons from the anode to the cathode. In addition to conducting hydrogen protons, the membrane acts as a gas separator, generally isolating the hydrogen-containing fuel stream from the oxygen-containing oxidant stream (although nominal gas cross-over does occur). At the cathode, oxygen reacts at the catalyst layer to form anions. The anions formed at the cathode react with the hydrogen ions that have crossed the membrane, forming water as the reaction product. The anode and cathode reactions in hydrogen/oxygen fuel cells are as follows:

Anode reaction:

Cathode reaction:

Typically, the MEA and gas diffusion backings are interposed between a pair of electrically conductive fluid flow field plates, or collector plates, each having at least one flow passage formed therein. These flow field plates are typically fabricated from graphite or metal. The flow passages, or channels, direct the fuel and oxidant to the respective electrodes; namely, fuel to the anode and oxidant to the cathode. The plates act as current collectors, provide structural support for the electrodes, provide access channels for transporting the fuel and oxidant to the anode and cathode, respectively, and provide channels for the removal of product water formed during operation of the cell.

Hydrogen transport through the PEM requires the presence of water molecules within the membrane. Consequently, maintaining adequate membrane hydration is critical. In addition to maintaining adequate ionic conductivity and proton transport, uniform membrane hydration prevents localized drying, or hot spots, resulting from higher localized resistance. Overall, dehydration may impede performance, increase resistive power losses and degrade the structure of the membrane. In conventional fuel cells, membrane hydration is achieved by humidifying the fuel and oxidant gases prior to their introduction into the fuel cell.

One commonly-used method for pre-humidifying fuel cell gas streams is to employ membrane-based humidifiers. Where membrane-based humidifiers are employed, reactant humidification is achieved by flowing the respective gases on one side of a water vapor exchange membrane while flowing deionized water on the opposite side of the membrane. In such arrangements, water is transported across the membrane to humidify the fuel and oxidant gases. Another known technique for pre-humidifying the reactant gas streams comprises exposing the gases directly to water in an evaporation chamber to permit the gas to absorb evaporated water. Yet another known pre-humidification technique comprises directly injecting or aspirating water into the respective gas streams before introducing them into the fuel cell.

Generally, pre-humidification is undesirable because it requires auxiliary fuel cell components, increasing the relative complexity of fuel cell systems. For instance, pre-humidification generally requires dedicated components for storing and transporting water. Additional components may also present system reliability issues. For example, where fuel cells are operated in sub-freezing conditions, water solidification can result in the weakening of mechanical components. Auxiliary water storage and transport components also reduce operating efficiency and add to the overall cost of the system.

For the foregoing reasons, the need exists for a PEM fuel cell assembly capable of maintaining hydration of the fuel cell membrane without requiring additional components for humidifying reactant streams prior to their introduction into the fuel cell stack.

SUMMARY OF THE INVENTION

It is an object of this invention to provide a polymer electrolyte membrane (PEM) fuel cell capable of maintaining membrane hydration upon the introduction of at least one dry reactant stream into the cell.

It is another object of this invention to provide a PEM fuel cell in which membrane hydration is maintained using water provided as a byproduct of electrochemical reactions within the fuel cell.

It is a further object of this invention to provide a PEM fuel cell which does not require components dedicated to pre-humidification of reactant gas streams.

These and other objects of the invention are achieved by the PEM fuel cell assembly of the present invention. A self-humidifying polymer electrolyte membrane (PEM) fuel cell has a membrane electrode assembly (MEA), comprising an ion-exchange membrane interposed between catalyzed anode and cathode electrodes. The MEA is interposed between a pair of gas diffusion backings, and the resulting structure is interposed between fuel and oxidant flow field plates. The fuel flow field plate has a fuel stream inlet, a fuel stream outlet, and means for flowing the fuel stream therebetween. The oxidant flow field plate has an oxidant stream inlet, an oxidant stream outlet, and means for flowing the oxidant stream therebetween.

In the preferred embodiment of the invention, fuel and oxidant flows are strategically directed to enhance the transfer of water byproduct, through the ion exchange membrane, between opposing gas streams. Dry fuel and oxidant streams are introduced into respective fuel and oxidant inlets. The corresponding flow field plate channels are oriented such that dry portions of reactant stream adjacent to one surface of the membrane generally oppose hydrated portions of reactant stream on the opposite surface of the membrane. In this embodiment, membrane hydration is maximized by providing countercurrent reactant flows. In other words, the reactant gases are directed in generally opposing directions through the fuel cell. Preferably, opposing channel lengths having disparate humidification levels are aligned to provide an increased humidification gradient therebetween, resulting in enhanced mass transfer of water across the membrane in the direction of the less humidified reactant stream. Channel alignment also minimizes the water transfer distance between opposing channels. At one extreme, portions of channels carrying dry reactant oppose portions of channels on the opposite side of the membrane carrying saturated reactant.

Although contiguous channel designs (e.g., serpentine patterns) are effective, it is preferred that noncontiguous, interdigitated channels are employed to provide forced convection of the reactants through the respective fuel and oxidant diffusion layers. Forced convection propels the reactants closer to the respective catalyst layers, thereby enhancing the electrochemical reactions at the opposing cathode and anode sides of the membrane. As a result, the rate of production of water byproduct at the cathode is increased. Furthermore, although countercurrent flows are preferred, other orientations have proven effective. For example, perpendicular interdigitated flow fields, resulting in reactant cross flow, are effective for enhancing membrane hydration in fuel cells employing at least one dry reactant stream.

In an alternate embodiment of the invention, liquid-to-gas humidification is accomplished by directing dry fuel and oxidant inlet flow streams over liquid deionized water zones prior to their introduction into catalyzed regions of the cell. In particular, a stream of deionized water is directed over one side of an uncatalyzed portion of membrane, while dry reactant gas is directed on the opposite side of the membrane. The water is transported through the bare membrane and diffuses into the inlet gas stream as water vapor.

In a further embodiment of the invention, membrane hydration enhancement zones are incorporated to provide additional membrane hydration/gas stream humidification. In particular, the zones comprise uncatalyzed areas of the PEM. These regions may consist of bare membrane interposed between gas diffusion layers or, alternatively, bare membrane directly interposed between opposing flow field plates. Uncatalyzed membrane is less hydrophobic than an catalyzed membrane. Consequently, liquid water is more apt to be absorbed into uncatalyzed areas of the membrane. Absorption of liquid water into uncatalyzed regions of the membrane is further aided by the elimination of exothermic electrochemical reactions which normally occur at catalyzed membrane/diffusion layer interfaces. By eliminating this reaction heat, the membrane within the zone is maintained at a reduced temperature and is less prone to drying.

DETAILED DESCRIPTION OF THE PREFERRED EMBODIMENTS

Figure 1:
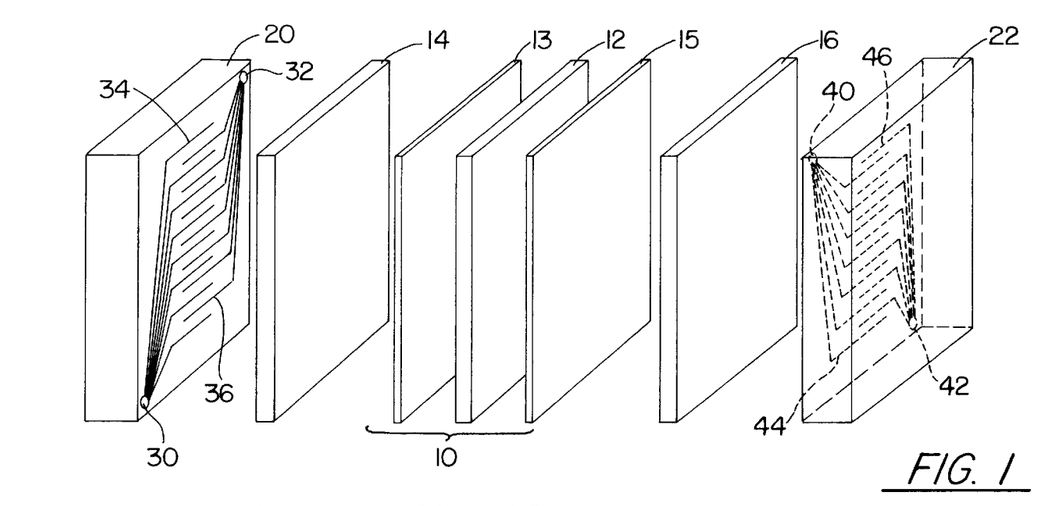
FIG. 1 is an exploded view of a PEM fuel cell assembly in accordance with the present invention.
Figure 2:
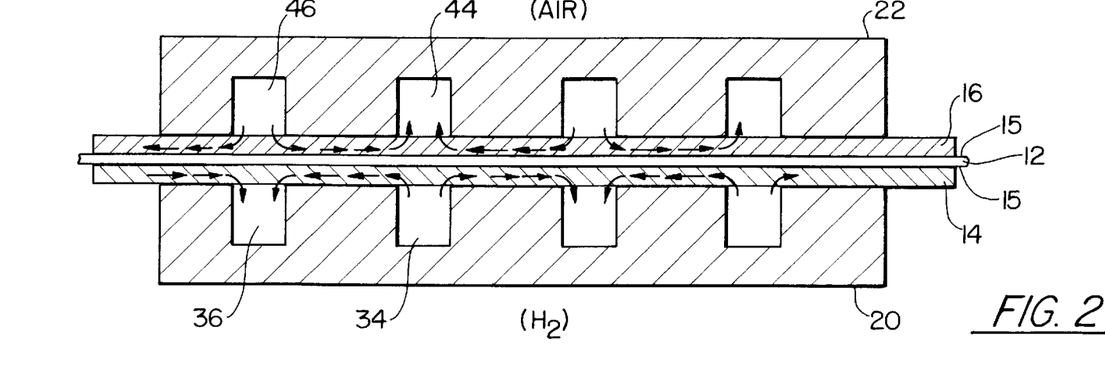
FIG. 2 is a cross-sectional view of a PEM fuel cell assembly having interdigitated flow field channels in accordance with a preferred embodiment of the present invention.

Referring now to FIGS. 1 and 2, a polymer electrolyte membrane (PEM) fuel cell includes a membrane electrode assembly (MEA) 10, gas diffusion backings 14, 16, and current collector/reactant flow field plates 20, 22. Membrane electrode assembly 10 consists of a polymer electrolyte membrane 12 interposed between a pair of electrodes 13, 15. The electrodes include a catalyst, such as platinum or platinum supported on carbon, for inducing desired electrochemical reactions. The catalyst can be attached to the diffusion backings 14, 16, and the backings subsequently pressed against the membrane 12. However, it is preferred that the catalyst is directly adhered to the membrane. Membrane electrode assembly 10 is interposed between porous, electrically-conductive gas diffusion backings 14 and 16. Examples of gas diffusion backings include carbon/graphite fiber paper and carbon/graphite cloth sheets. Fuel and oxidant flow field plates 20 and 22 are positioned on opposing anode and cathode sides of the assembly, respectively. In operation, multiple fuel cell assemblies are positioned side by side to form a fuel cell stack (not shown).

Fuel flow field plate 20 has fuel inlet channels 34 extending from fuel inlet port 30, and fuel outlet channels 36 extending from fuel outlet port 32. Similarly, oxidant flow field plate 22 has oxidant inlet channels 46 extending from oxidant inlet port 42, and oxidant outlet channels 44 extending from oxidant outlet port 40. The respective inlet and outlet channels formed in each plate are noncontiguous, or dead-ended, and interdigitated. By employing dead-ended, interdigitated inlet and outlet channels, the reactants are forced to flow through the respective porous diffusion layers 14, 16. For instance, referring to fuel flow field plate 20 on the anode side of the fuel cell, hydrogen gas entering through fuel inlet port 30 and filling inlet channels 34 is forced through porous diffusion layer 14 before continuing to flow through fuel outlet channels 36 toward fuel outlet 32. Conventional contiguous channel designs, such as those employing serpentine patterns, rely primarily on diffusion for fluid transport through the diffusion layer. In contrast, the interdigitated channels of the present invention employ forced convection of the reactant through the diffusion layer, urging the reactant closer to the catalyst layer. Forced convection results in more rapid reactant flow through the diffusion layer vis-a-vis diffusion. As a result, the electrochemical reaction rates at the respective catalyst sites are increased. The interdigitated flow channels on the cathode (oxidant) side operate in a similar manner. As a result of the enhanced electrochemical reactions, the production rate of water byproduct at the cathode is increased. A portion of the additional water produced at the cathode back-diffuses through the membrane toward the anode. Consequently, the availability of water at the anode is also increased when interdigitated channels are used.

Figure 3:
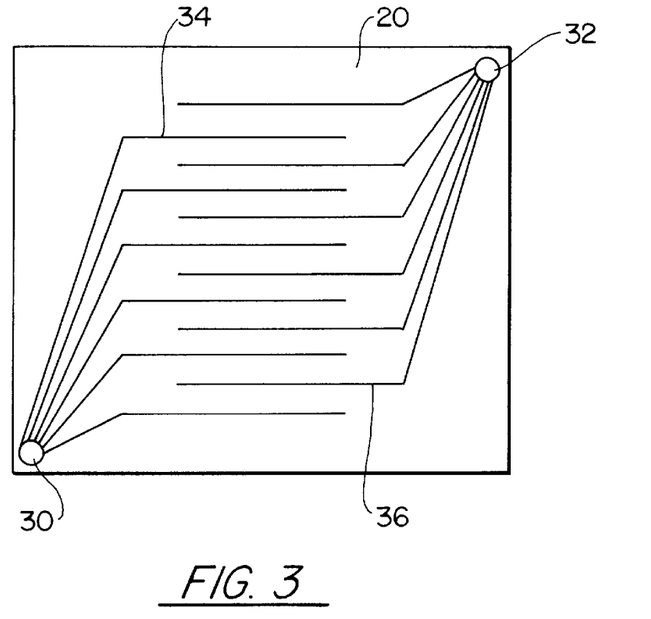
FIG. 3 is a front view of a field flow plate having an interdigitated reactant flow channel design in accordance with a preferred embodiment of the present invention.

Referring briefly to FIG. 3, a front view of flow field plate 20 is depicted to illustrate a unique interdigitated flow field pattern in accordance with the preferred embodiment of the present invention. Conventional interdigitated designs typically employ a plurality of flow channels branching off from a main flow channel, e.g., see U.S. Pat. No. 5,641,586 to Wilson. In contrast, the present invention employs non-overlapping flow channels 34, 36 each extending from a reactant stream port 30, 32. The interdigitated flow pattern of the present invention results in more uniform fluid flow distribution, reduced channel moisture retention, and decreased channel pressure drop. Consequently, more uniform electrical current density is achieved across the fuel cell.

Figure 4:
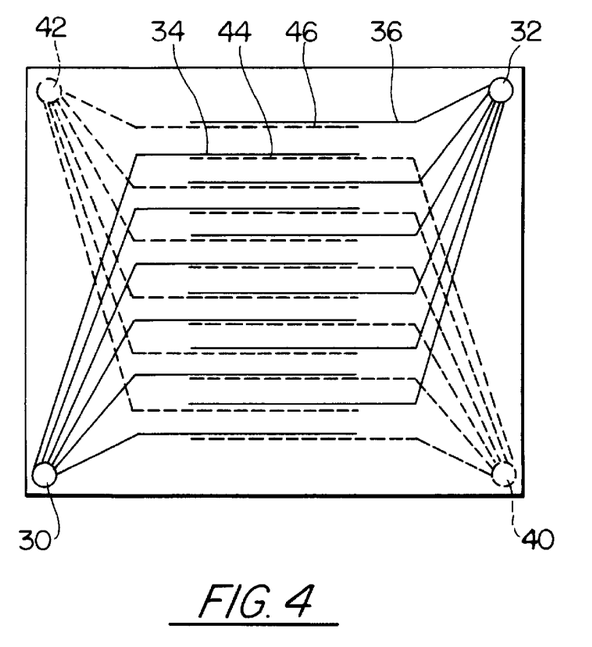
FIG. 4 is a schematic of a preferred fuel cell assembly in which opposing collector plate channels are shown superimposed on one another.

Referring now to FIG. 4, the fuel and oxidant flow field plate channels are shown superimposed for the purpose of discussion. In the preferred embodiment of the present invention, the fuel and oxidant flow fields are oriented to achieve countercurrent fuel and oxidant flow streams. In other words, the fuel and oxidant stream flow in generally opposed directions across the fuel cell assembly. The water content of both the fuel and oxidant streams increases in the flow direction of the respective reactant through the fuel cell. Therefore, by employing a countercurrent flow arrangement, the region of the anode layer with the highest water content substantially coincides with the region of the cathode layer having the lowest water content, and vice versa. As a result, countercurrent reactant flow streams result in more uniform hydration of the ion-exchange membrane.

Fuel and oxidant inlet ports are denoted by reference numerals 30 and 42, respectively. Fuel and oxidant outlet ports are denoted by reference numerals 32 and 40, respectively. The horizontal lengths of the corresponding fuel and oxidant channels are shown slightly offset from one another in a vertical direction for illustrative purposes; although such an arrangement is possible, it is not preferred. Preferably, the horizontal lengths of fuel inlet channels 34 and oxidant outlet channels 44, and the horizontal lengths of oxidant inlet channels 46 and fuel outlet channels 36, overlie one another when viewed perpendicular to the reactant flow planes. As used herein, the term "superposed" is used to describe this overlapping relationship of opposing collector plate channels. There are a number of advantages to providing superposed channels. For instance, channel alignment results in corresponding alignment of lands, or non-channel areas, of opposing flow field plate surfaces. Maximizing land-to-land alignment between flow field plates results in optimized electrical conductivity between opposing current collector plates upon compression of the individual cells making up the fuel cell stack. In other words, aligning the opposing collector plate lands minimizes increases in electrical resistance across the cell associated with land-to-channel alignment. Furthermore, channel alignment increases the mass transfer rate of water across the membrane, especially in regions where a well-hydrated gas stream is positioned opposite a dry, or non-hydrated, gas stream. Where this is the case, the water transfer rate across the membrane is increased due to the gradient created by the hydration level differential on opposite sides of the membrane. Channel alignment is especially beneficial for hydrating peripheral regions of the membrane, where dry gases are typically introduced into the cell. Employing the preferred countercurrent reactant flow arrangement, the ingress of dry reactant gas on one side of the membrane is aligned with the egress of well-hydrated reactant gas on the opposite side of the membrane. In conventional fuel cell assemblies, inlet gas streams are pre-humidified to prevent dehydration of the membrane at gas inlet areas. In the present invention, humidified reactant streams may be provided initially when membranes are completely dry, to initiate the required electrochemical reactions at the respective electrodes. However, upon achieving an adequate fuel cell operating level, adequate membrane hydration can be maintained running only dry reactant flows.

Figure 5:
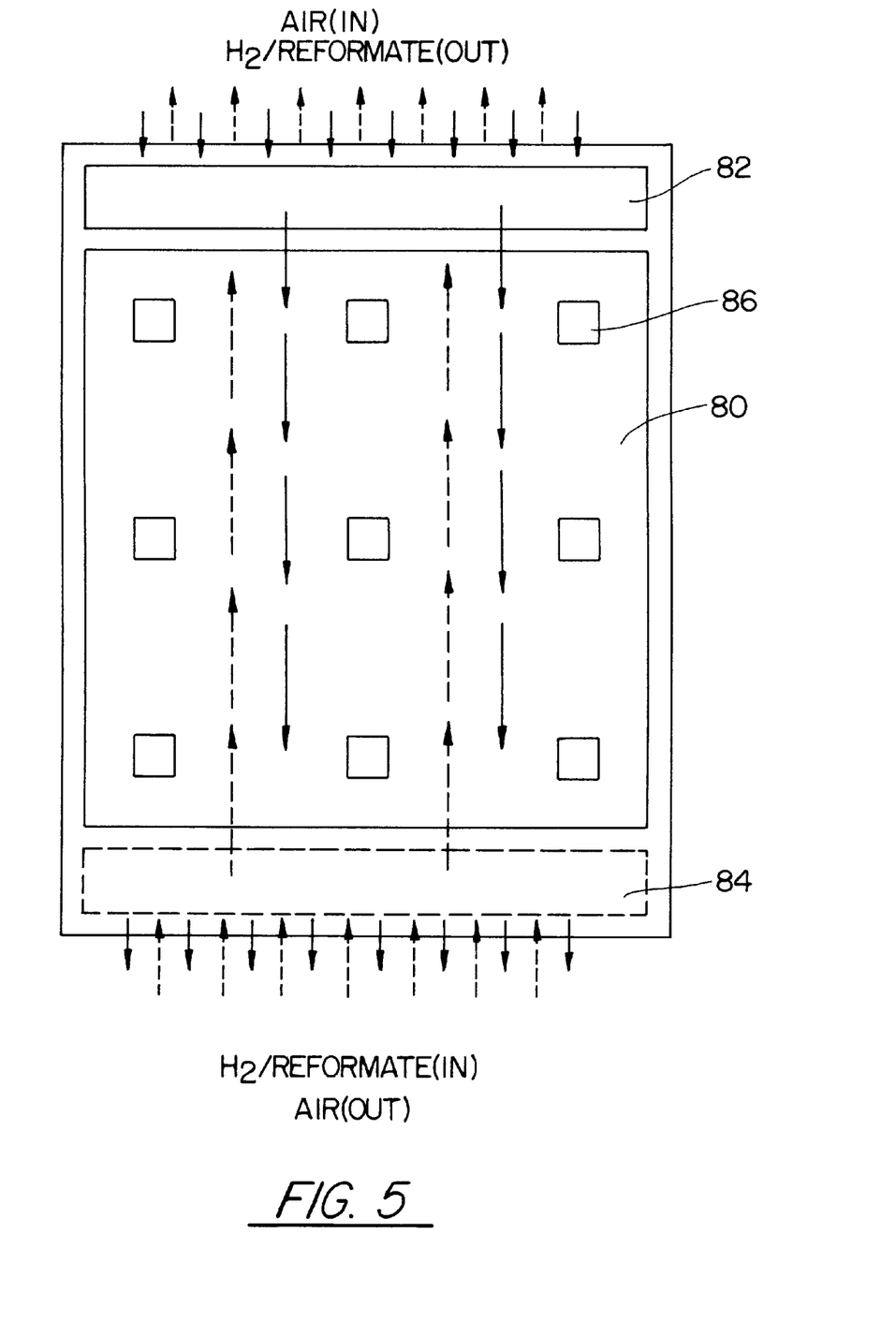
FIG. 5 is a schematic of a fuel cell assembly having membrane hydration enhancement zones in accordance with an alternate embodiment of the present invention.

Referring now to FIG. 5, an alternate embodiment of the present invention incorporates at least one membrane hydration enhancement zone. Specifically, portions 82, 84 of the ion-exchange membrane are left uncatalyzed to enhance self-humidification of the fuel cell assembly, especially in regions of the membrane prone to drying. Uncatalyzed membrane areas are less hydrophobic than catalyzed membrane areas. Consequently, uncatalyzed areas are more apt to attract and retain liquid water. Accordingly, as a reactant stream containing liquid water flows through an uncatalyzed region of the membrane, the water is more likely to pool atop, and subsequently absorb into, the membrane. This results in both local membrane hydration and increased humidification of the reactant stream flowing on the opposite side of the membrane. Lateral absorption of water through the membrane results in increased hydration of catalyzed regions of the membrane as well.

Membrane hydration is further enhanced by the lack of electrochemical reactions in these hydration enhancement zones. As previously described, the fuel cell electrochemical reactions at the respective electrodes are initiated by catalyst layers at the membrane/diffusion layer interfaces. The heat produced by these electrochemical reactions tends to dry the membrane locally. However, absent a catalyst, the gas reactants flow without producing these exothermic electrochemical reactions. The reduced membrane temperatures decrease local membrane dehydration.

Preferably, uncatalyzed areas 82 and 84 are strategically located proximate to reactant flow inlet and outlet areas on opposite sides of catalyzed area 80. Since reactant humidification typically increases in the reactant flow direction, the lowest reactant humidification levels typically occur near the reactant channel inlets, and the highest reactant humidification levels typically occur near the reactant channel outlets. At least a portion of the humidified outlet channel lengths are routed through the humidification zones 82, 84, hydrating the membrane locally through absorption of reactant stream water. Inlet channels carrying dry reactant gas are routed through the humidification zones 82, 84 on the opposite side of the membrane. The humidification gradient across the membrane, caused by the opposing dry and humidified reactant streams, results in the transfer of water absorbed by the membrane to the respective dry inlet gas streams.

Humidification zones may be created by utilizing an ion-exchange membrane with integrally attached electrodes that maintain uncatalyzed regions. Alternatively, humidification zones may be created by providing a diffusion layer having both catalyzed and uncatalyzed areas. In some instances, it may be desirable to further treat the diffusion layer such that the catalyzed areas are hydrophobic, and the uncatalyzed areas, corresponding to humidification zones, are hydrophilic. This is easily accomplished by selectively coating the diffusion layer with a hydrophobic material such as Teflon®. Alternatively, humidification zones can comprise an ion-exchange membrane directly interposed between opposing flow field plates, where one or both sides of the membrane are not supported by a diffusion layer. In this embodiment, it is preferable to use an integrally reinforced PEM membrane, such as GORE PRIMEA®, manufactured by W.L. Gore & Associates, Inc. of Elkton, Md. Elimination of the diffusion layer reduces gas flow and permits localized "pooling" of water. The elimination of the diffusion layer also permits gas-to-water sealing along the periphery of the zone. These water-to-membrane contact zones may directly humidify a gas flowing on the opposite side of the membrane, or extend sealed deionized water zones via lateral water absorption/hydration through the membrane. Hydration enhancement zones 86 may be distributed throughout the fuel cell assembly for further membrane hydration. Although specific humidification zone quantities and geometries are illustrated, the invention is not intended to be so limited. For instance, the membrane can incorporate hundreds, or even thousands, of uncatalyzed areas (e.g., microdots), having dimensions on the order of microns, distributed throughout the assembly to enhance membrane hydration.

Figure 6:
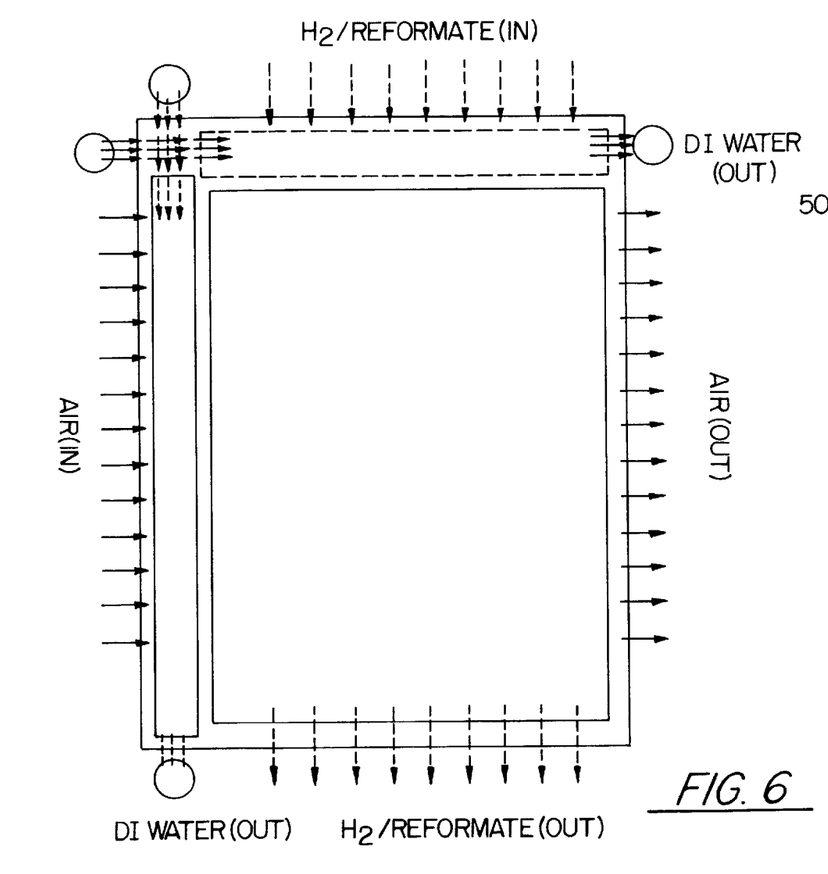
FIG. 6 is a schematic of a fuel cell assembly having membrane hydration enhancement zones in accordance with a further embodiment of the present invention.

Referring now to FIG. 6, in a further embodiment of the invention, liquid-to-gas membrane hydration/reactant humidification is enhanced by directing dry fuel and oxidant inlet flow streams over liquid deionized water zones prior to their introduction into catalyzed regions of the cell. In particular, a stream of deionized water introduced into the fuel cell assembly is directed over one side of an uncatalyzed portion of membrane, while dry reactant gas is directed over the opposite side of the membrane. Water absorbed by, and transported through, the bare membrane diffuses into the dry inlet gas stream as water vapor.

Figure 7:
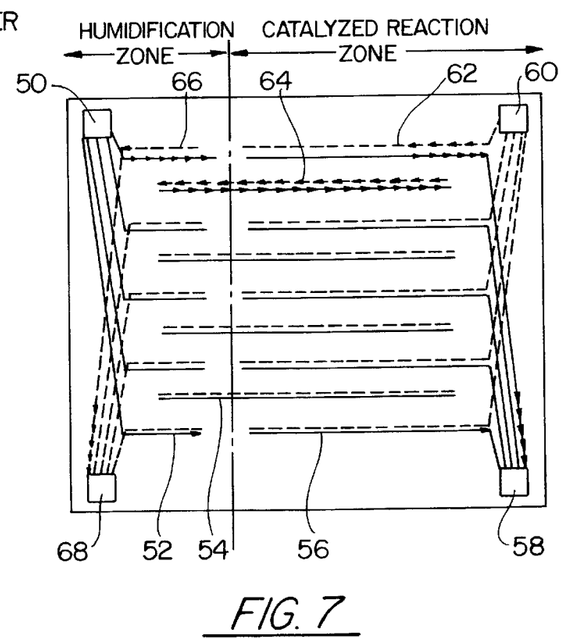
FIG. 7 is a schematic of a fuel cell assembly incorporating double-interdigitated flow field channels, in which opposing collector plate channels are shown superimposed on one another, in accordance with an alternate embodiment of the invention.
Figure 8:
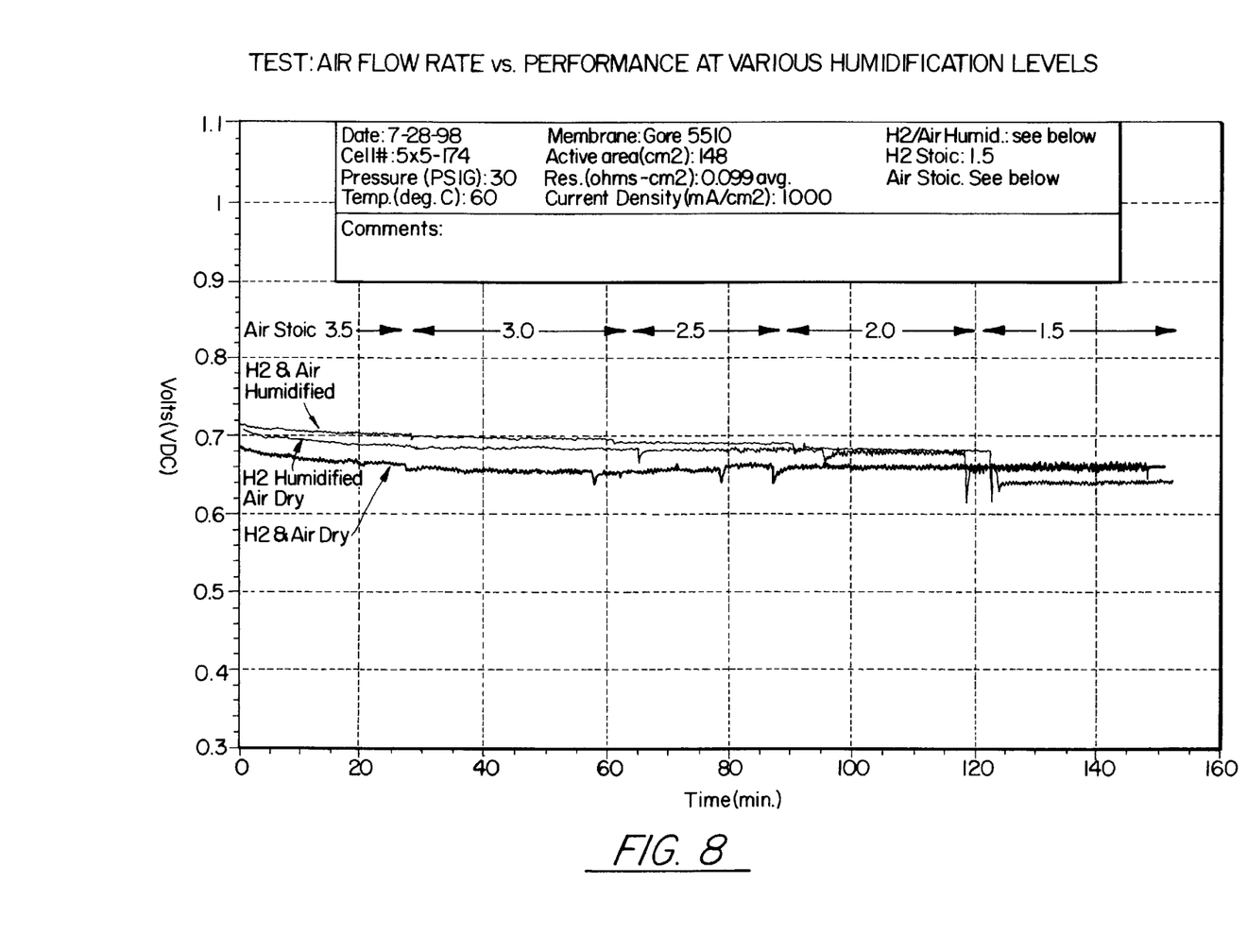
FIG. 8 is a graph illustrating the effect of air flow rate and humidification level on the performance of a fuel cell assembly constructed in accordance with the present invention.
Figure 9:
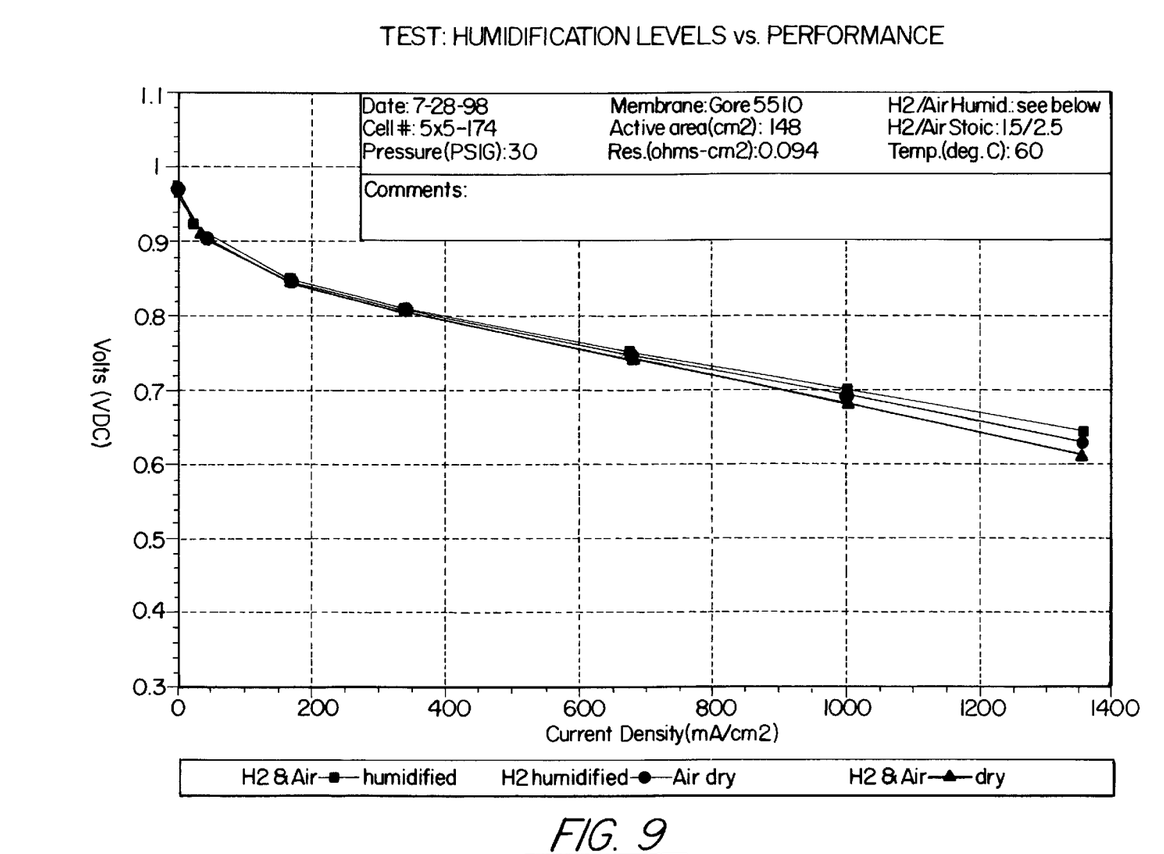
FIG. 9 is a graph illustrating the effect of humidification level on the performance of a fuel cell assembly constructed in accordance with the present invention.

Referring now to FIG. 7, yet a further embodiment of the invention incorporates a double-interdigitated flow field channel design. The cathode and anode flow field channels are shown superimposed and slightly offset. The vertical offset is for illustrative purposes only and is not preferred. The fuel cell assembly has at least one uncatalyzed humidification zone and at least one catalyzed reaction zone. In operation, two reactants are communicated through the assembly. However, for simplicity, the following description only refers to one of the reactants. A first reactant is introduced through inlet 50 into inlet channels 52. Inlet channels 52 extend across the humidification zone, and function solely to humidify the first reactant. Preferably, the first reactant is humidified to the point of saturation. The saturated first reactant is subsequently transferred, by forced convection, from inlet channels 52, through intermediate channels 54, to outlet channels 56. As a result of the double convection, both reactant and water vapor are more evenly distributed during transport across the polymer electrolyte membrane. This embodiment may further incorporate features of previously described embodiments, e.g., countercurrent reactant flow, superposed channels, etc.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A self-humidifying polymer electrolyte membrane (PEM) fuel cell assembly having an ion-exchange membrane interposed between a pair of electrodes to form a membrane/electrode assembly (MEA), the MEA interposed between fuel and oxidant diffusion layers, the fuel cell assembly comprising:

a fuel flow field plate having a fuel stream inlet, a fuel stream outlet, and means for flowing a fuel stream therebetween; and an oxidant flow field plate having an oxidant stream inlet, an oxidant stream outlet, and means for flowing an oxidant stream therebetween, said oxidant and fuel streams having countercurrent stream flows in said diffusion layers, for flowing a fuel stream and said means for flowing an oxidant stream employing forced convection of said stream through one of said diffusion layers.

2. A self-humidifying polymer electrolyte membrane (PEM) fuel cell assembly as recited in claim 1, wherein at least one of said means for flowing a fuel stream and said means for flowing an oxidant stream comprises interdigitated flow field plate channels.

3. A self-humidifying polymer electrolyte membrane (PEM) fuel cell assembly as recited in claim 2, wherein said interdigitated flow field plate channels comprise at least one selected from the group consisting of a first plurality of non-overlapping inlet channels which extend from a common reactant stream inlet port, said common reactant stream inlet port having an opening for receiving reactants, and a second plurality of non-overlapping outlet channels which extend from a common reactant stream outlet port, said common reactant stream outlet port having an opening for exhausting reactants and reactant product.

4. A self-humidifying polymer electrolyte membrane (PEM) fuel cell assembly as recited in claim 1, wherein said means for flowing a fuel stream and said means for flowing an oxidant stream are at least partially superposed across said ion-exchange membrane to enhance water transfer therebetween.

5. A self-humidifying polymer electrolyte membrane (PEM) fuel cell assembly as recited in claim 2, wherein said means for flowing a fuel stream and said means for flowing an oxidant stream both comprise interdigitated inlet and outlet flow field channels, said oxidant inlet channels and fuel outlet channels, and said oxidant outlet channels and fuel inlet channels, at least partially superposed across said ion-exchange membrane to enhance channel-to-channel water transfer across said membrane.

6. A self-humidifying polymer electrolyte membrane (PEM) fuel cell assembly as recited in claim 1, further comprising at least one membrane hydration enhancement zone.

7. A self-humidifying polymer electrolyte membrane (PEM) fuel cell assembly as recited in claim 6, wherein said at least one membrane hydration enhancement zone comprises an uncatalyzed area of said membrane and an uncatalyzed area of said electrodes, said uncatalyzed electrode area adjacent to said uncatalyzed membrane area.

8. A self-humidifying polymer electrolyte membrane (PEM) fuel cell assembly as recited in claim 7, wherein at least one of said gas diffusion layers is hydrophilic.

9. A self-humidifying polymer electrolyte membrane (PEM) fuel cell assembly as recited in claim 6, wherein at least one surface of said membrane is directly adjacent to a flow field plate surface.

10. A self-humidifying polymer electrolyte membrane (PEM) fuel cell assembly as recited in claim 6, wherein said at least one membrane hydration enhancement zone comprises a plurality of membrane hydration zones dispersed throughout said fuel cell assembly.

11. A self-humidifying polymer electrolyte membrane (PEM) fuel cell assembly as recited in claim 6, wherein said at least one membrane hydration enhancement zone comprises deionized water and gas reactant streams directed over opposite sides of said ion-exchange membrane.

12. A self-humidifying polymer electrolyte membrane (PEM) fuel cell assembly as recited in claim 11, wherein said water and gas reactant streams have opposing flow directions.

13. A self-humidifying polymer electrolyte membrane (PEM) fuel cell assembly as recited in claim 1, wherein said fuel comprises hydrogen gas.

14. A self-humidifying polymer electrolyte membrane (PEM) fuel cell assembly having a membrane/electrode assembly (MEA), the MEA including an ion-exchange membrane interposed between a pair of electrodes, the MEA interposed between a pair of gas diffusion layers, the fuel cell comprising:

a fuel flow field plate having a fuel stream inlet, a fuel stream outlet, and means for flowing a fuel stream therebetween;

an oxidant flow field plate having an oxidant stream inlet, an oxidant stream outlet, and means for flowing an oxidant stream therebetween; and at least one membrane hydration enhancement zone, wherein said at least one membrane hydration enhancement zone comprises an uncatalyzed area of said membrane and at least one uncatalyzed area of said electrodes, said uncatalyzed electrode area adjacent to said uncatalyzed membrane area.

15. A self-humidifying polymer electrolyte membrane (PEM) fuel cell assembly as recited in claim 14, wherein at least one of said means for flowing is directed through said at least one membrane hydration enhancement zone.

16. A self-humidifying polymer electrolyte membrane (PEM) fuel cell assembly as recited in claim 15, wherein said fuel and oxidant reactants flows have countercurrent flow directions through said membrane hydration enhancement zone.

17. A self-humidifying polymer electrolyte membrane (PEM) fuel cell assembly as recited in claim 14, wherein at least one of said means for flowing reactant comprises interdigitated flow field channels.

18. A self-humidifying polymer electrolyte membrane (PEM) fuel cell assembly as recited in claim 14, wherein at least one of said means for flowing reactant comprises double-interdigitated flow field channels.

19. A method for maintaining membrane hydration in a polymer electrolyte membrane (PEM) fuel cell, the fuel cell having a membrane electrode assembly (MEA) interposed between gas diffusion layers, the gas diffusion layers interposed between fuel and oxidant flow field plates, the method comprising the steps of:

introducing fuel and oxidant reactants into said fuel cell through respective fuel and oxidant inlets, at least one of said reactants introduced in a dry, non-humidified state;

communicating said fuel and oxidant reactants through respective fuel and oxidant flow field channels; and exhausting said reactants through fuel and oxidant outlets, wherein said fuel and oxidant flow field channels are noncontiguous and interdigitated, and the step of communicating further comprises communicating the fuel and oxidant reactants from fuel and oxidant inlet channel lengths, through the respective fuel and oxidant diffusion layers in countercurrent directions, to fuel and oxidant outlet channel lengths, respectively, whereby relatively less hydrated gas flows are opposed to relatively more hydrated gas flows to increase moisture gradient and moisture transfer through and to the membrane.

20. A method as recited in claim 19, further comprising, prior to the step of exhausting, the step of directing at least one of said reactants through a membrane hydration enhancement zone.

21. A method as recited in claim 19, wherein said reactants are communicated in countercurrent directions through said fuel and oxidant flow field channels.

22. A method as recited in claim 20, wherein said reactants are communicated in countercurrent directions through said fuel and oxidant flow field channels.

23. A method as recited in claim 19, further comprising, prior to the step of exhausting, the step of directing at least one of said reactants through a membrane hydration enhancement zone.

24. A method as recited in claim 23, wherein said reactants are communicated in countercurrent directions through said fuel and oxidant flow field channels.

25. A method as recited in claim 19, further comprising, before the step of introducing, the step of pre-hydrating the membrane.

26. A method as recited in claim 25, wherein said step of pre-hydrating comprises introducing at least one saturated reactant into said fuel cell.

27. A self-humidifying polymer electrolyte membrane (PEM) fuel cell assembly as recited in claim 3, wherein said interdigitated flow field plate channels extend directly from said common ports.

28. A self-humidifying polymer electrolyte membrane (PEM) fuel cell assembly as recited in claim 3, wherein said interdigitated flow field plate channels extend directly and separately from said common ports.

29. A self-humidifying polymer electrolyte membrane (PEM) fuel cell assembly as recited in claim 3, wherein said port openings have surface normals substantially transverse to a plane defined by said flow field plates.

30. A method as recited in claim 19, wherein said respective interdigitated flow field plate channels extend directly from a common port.

31. A method as recited in claim 19, wherein said respective interdigitated flow field plate channels extend directly and separately from a common port.

32. A method as recited in claim 31, wherein fluids flowing into and out of said respective common port openings travel substantially transverse to fluids flowing in said interdigitated flow field plate channels.

* * * * *